Figure 3:
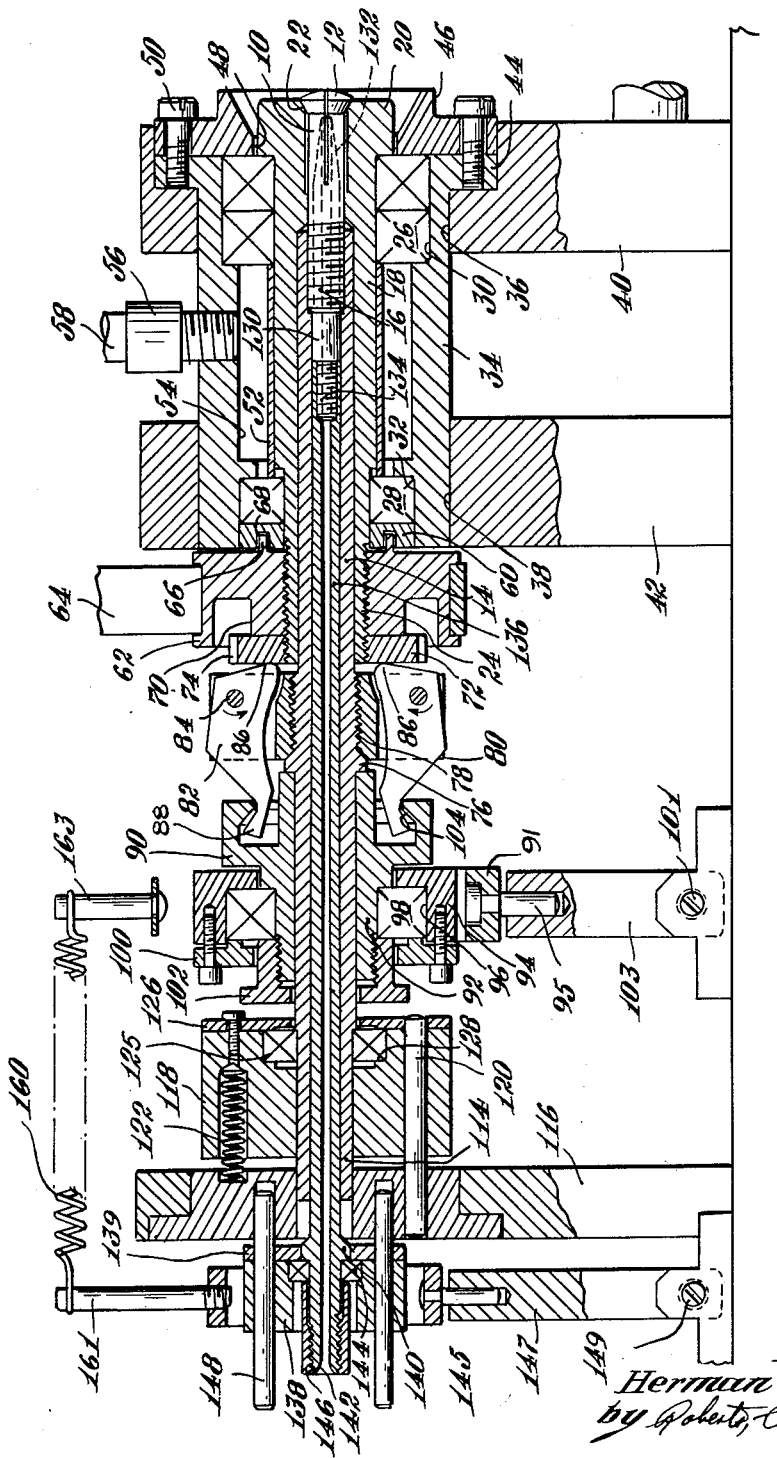

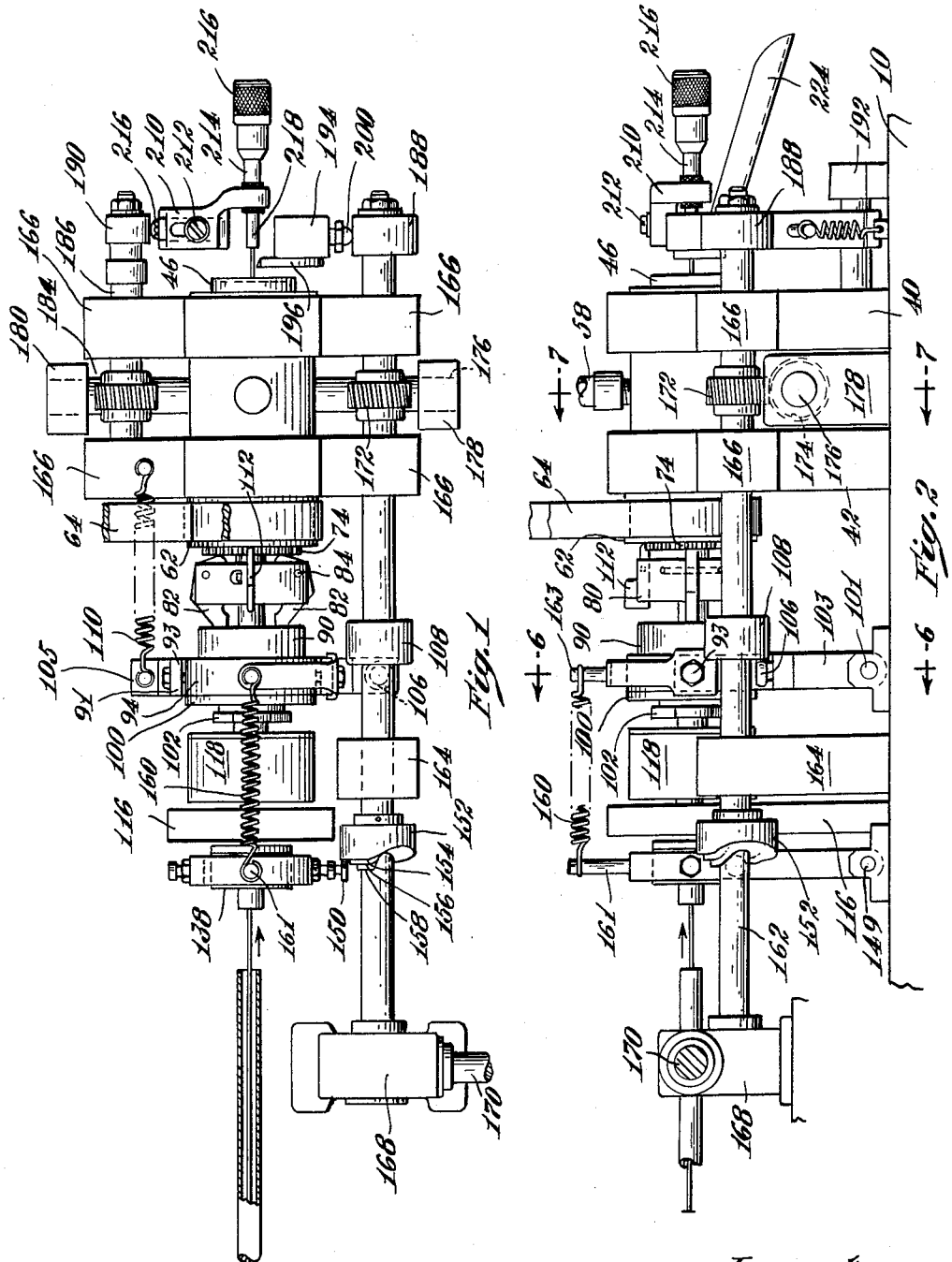

Inventor
Herman Anderson
by Roberts, Cushman & Grover
Attys

Inventor
Herman Anderson
by Roberts, Cushman & Grover
Att'ys

Dec. 15, 1959    H. ANDERSON    2,917,313
HIGH SPEED LATHE
Filed Feb. 15, 1955    4 Sheets-Sheet 4
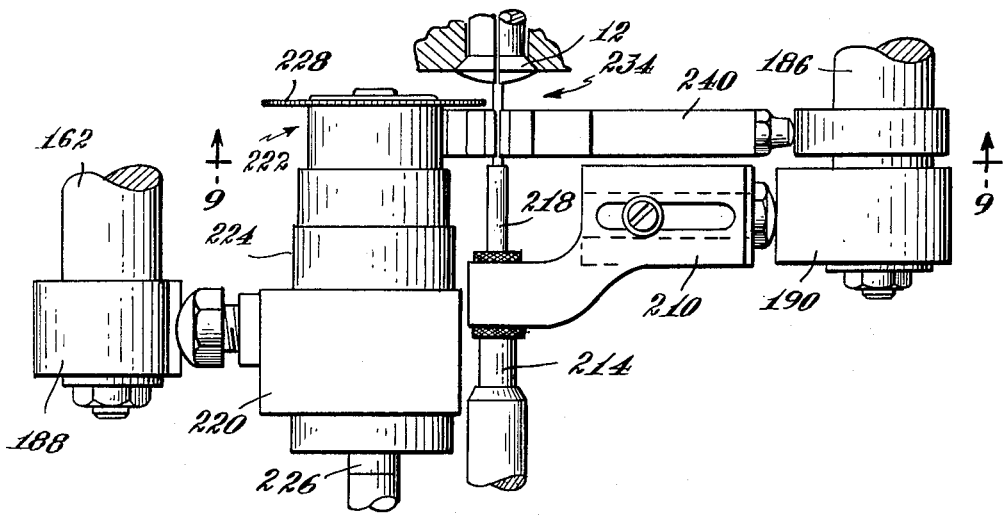
Fig. 8
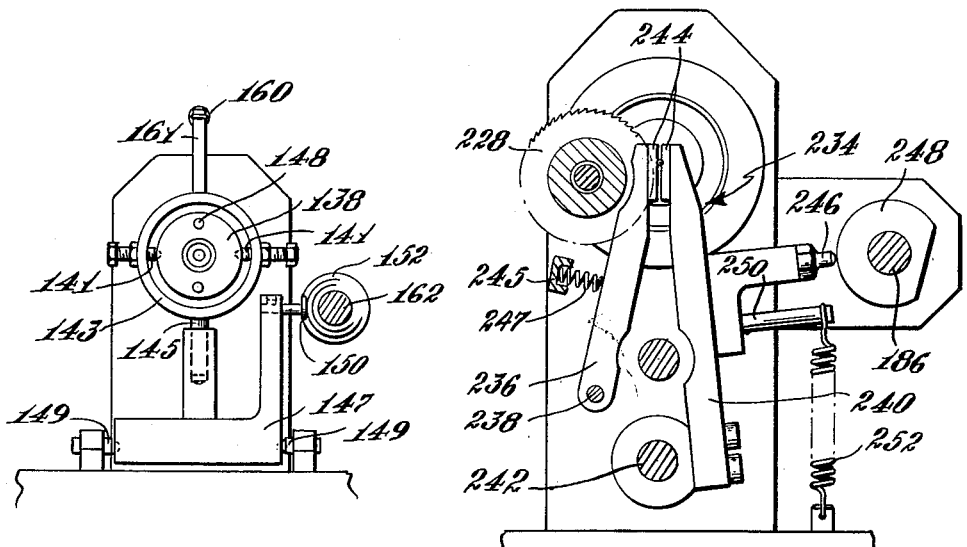
Fig. 5
Fig. 9
Inventor
Herman Anderson
by Roberts, Cushman & Grover
Attys United States Patent Office 2,917,313
Patented Dec. 15, 1959

2,917,313

HIGH SPEED LATHE

Herman Anderson, Winchester, N.H., assignor, by mesne assignments, to C. Jack Frost, Brattleboro, Vt.

Application February 15, 1955, Serial No. 488,230

13 Claims. (Cl. 279—1)

This invention relates to lathes and more especially to automatic lathes for making quantities of small metal parts of predetermined dimensions.

The principal objects of the invention are to provide a lathe which will operate at a very much higher speed than prior machines thereby multiplying the rate of output far beyond that of any machine now available, which in spite of the high rate capacity will not in any way injuriously affect the work as by drawing its temper or by burning it, which will automatically accurately position measured lengths of work to the cutting tool for cutting, which will effect feeding of the work for cutting without rebound, which will effect clamping of the work for cutting without retracting or advancing the measured length of work in a manner to spoil the accuracy of its initial measured length, which requires no facing operation between cutting successive pieces of the work, which will cut successive pieces without leaving center spurs, which will provide dimensional accuracy of plus or minus ten thousandths of an inch, and which will be substantially free of destructive and/or work displacing vibrations in spite of its high speed. Other objects are to provide a machine which has improved gauging means, interchangeable tools, improved work feeding means and adjustment thereof to permit varying the length of the work pieces at any given time, and improved means for adapting the machine to accommodate work of different sizes. Further objects are to provide a machine which is durable, adequately lubricated for high speed operation and requires no special skill in its operation.

As herein illustrated the lathe has a collet and collet tube within which is mounted for longitudinal movement a feed tube adapted frictionally to advance the work through the collet jaws for cutting. A gauge is arranged for alignment with the collet against which the leading end of the work advanced through the collet jaws is adapted to be moved and held to establish an exactly measured length of work for cutting off. Advancement of the work and holding the same against the gauge is effected by spring means associated with the feed tube which constantly holds the work against the gauge until the clamping jaws are clamped about the work. Following clamping of the work the feed tube is retracted rearwardly along the work for obtaining a new purchase thereon and there is means for varying the amount of retraction depending upon the length of the work to be advanced. The gauge is movable both to position it in alignment with the advancing work prior to clamping and cutting and to change its proximity to the collet to vary the length of the work to be cut off. The collet jaws are closed on the work by rearward movement of the collet tube. Rearward movement is effected by cam means which alternately retracts the tube and then releases it and forward movement is effected by spring means. At the high speed of operation employed the impact caused by the rapid reciprocation of the collet tube causes excessive vibrations; accordingly the rear end of the collet tube is cushioned by yieldable means engaged therewith, which means serves also to assist in restoring the collet tube to its forward position. The collet tube is mounted within a bushing sleeve for both longitudinal and rotational movement and the latter is mounted for rotation in bearings supporting the same. The bushing is rotatable by suitable means and has fast to it a spacer plate. Rearwardly of the spacer plate is a pair of levers pivotally mounted on the collet tube which has portions engaged with the face of the spacer plate. The levers in one position operate against the face of the spacer plate to force the collet tube rearwardly thereby to close the jaws but are normally held inoperative by centrifugal action. Cam means associated with the levers periodically forces them into operative position and then releases them. A driving connection between the rotating bushing and the collet tube is effected by a latch carried by the collet tube, a part of which is engaged with one of a plurality of notches in the edge of the spacer plate.

Figure 4:
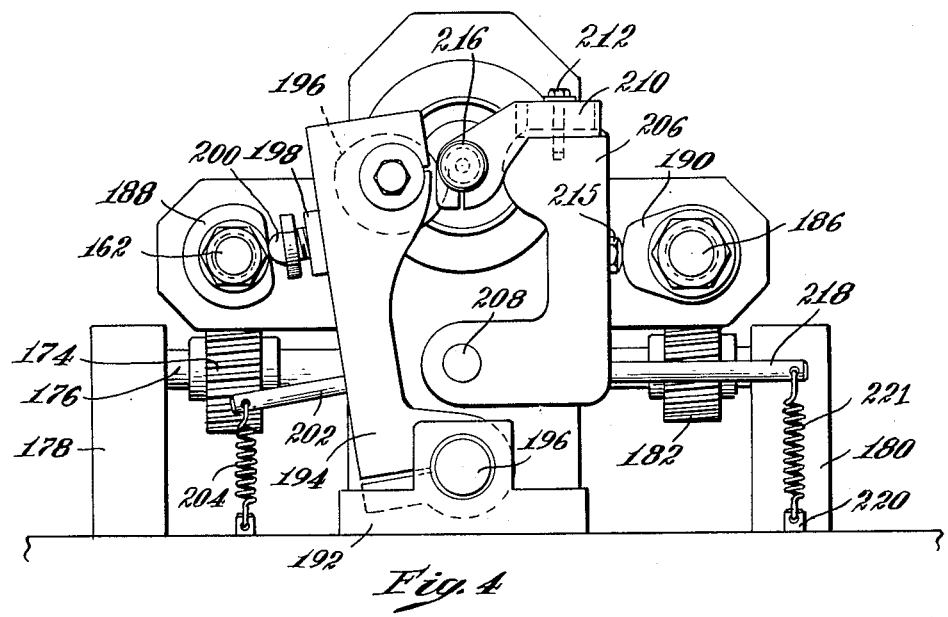
Figure 7:
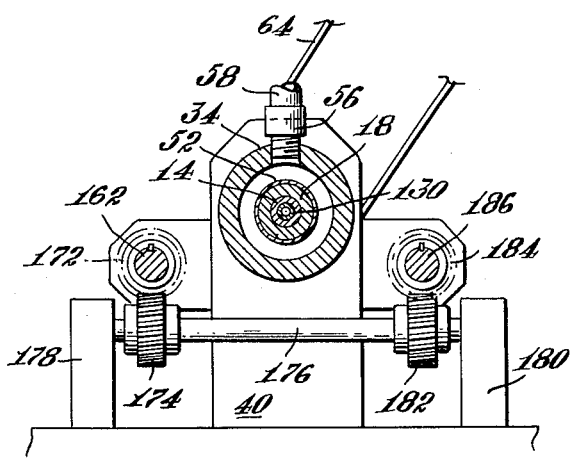
Figure 6:
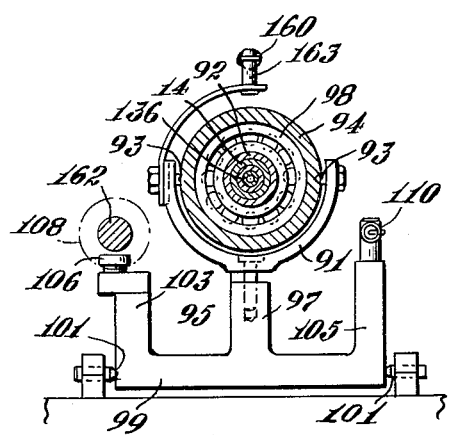

The invention will now be described in greater detail with reference to the accompanying drawings wherein:

Fig. 1 is a plan view of the machine;
Fig. 2 is a side elevation of the machine;
Fig. 3 is a longitudinal vertical section;
Fig. 4 is a front elevation of the machine showing a lathe-type cutter;
Fig. 5 is a rear elevation of the machine;
Fig. 6 is a transverse vertical section taken on the line 6—6 of Fig. 2;
Fig. 7 is a transverse vertical section taken on the line 7—7 of Fig. 2;
Fig. 8 is a plan view at the forward end of the machine showing a circular saw assembly; and
Fig. 9 is a transverse vertical section taken on the line 9—9 of Fig. 8 showing the clamping jaws.

Referring to the drawings (Fig. 3) there is a collet 10 having jaws 12 and rearwardly of its jaws a draw bar 14. For convenience the collet is a comparatively short hollow tube split diametrically at right angles at its forward end to provide resilient jaws and is threaded at its rear end for threaded engagement with the forward end 16 of the draw bar. The collet and draw bar are rotatably supported within a spindle 18 having at its forward end a head 20 in which there is a conical recess 22 for receiving the head of the collet which is oppositely tapered and at its rear end an externally threaded portion 24. The spindle is in turn rotatably mounted within bearings 26 and 28 seated in annular recesses 30 and 32 within a quill 34. The quill 34 is supported at its forward and rear ends in circular openings 36 and 38 formed in spaced posts 40 and 42 fastened at their lower ends to a rigid base. The forward end of the quill is provided with a radial flange 44 which is seated within an enlarged portion of the opening 36 and a cap 46 having a central opening 48 therein is bolted to the face of the flange by bolts 50 over the head 20 of the spindle and serves to retain the bearings 26 in place. A bushing 52 surrounds the spindle between the bearings 26 and 28 and between the bushing and the wall of the quill provides an annular chamber 54 (Figs. 3 and 7) to which oil is supplied by way of a nipple 56 threaded into the wall and flexible oil pipe 58. A threaded plate 60 screwed into the rear end of the quill retains the rear bearing 32 in place and confines the lubricant within the bearings and oil chamber.

Rearwardly of the quill there is mounted on the threaded portion 24 of the spindle a driving pulley 62 (Figs. 1, 2 and 3) on which there is entrained a belt 64 for effecting rotation of the spindle. The forward face of the pulley has an annular, forwardly projecting rib 66 (Fig. 3) thereon which runs in an annular groove 68 formed in the rear face of the plate 60 which provides an axial thrust bearing for the pulley preventing frictional contact of its forward surface with the rear end of the quill. The rear face of the pulley is cored out to lighten it and has a hub 70 against which is screwed a bearing plate 72 having in its periphery a plurality of notches 74. The bearing plate rotates with the pulley.

The draw bar 14 projects rearwardly from the rear end of the spindle and has on it an annular shoulder 76 forwardly of which is an externally threaded portion 78. A collar 80 is threaded on the draw bar against the shoulder 76 and has mounted at diametrically opposite points with reference to the axis of the draw bar a pair of levers 82 which are pivoted on pins 84 carried by the collar. The levers 82 have forward ends 86 which bear against the rear face of the bearing plate and rear ends 88 and are so balanced that the centrifugal force produced by rotation of the draw bar throws the rear ends 88 of the levers outwardly away from the axis of the draw bar. Outward movement of the rear ends of the levers 82 is constrained beyond a predetermined amount by an annular cam 90 which has integral with it a rearwardly extending barrel 92 (Fig. 3) encircling the draw bar. The barrel 92 is rotatably supported in a ring 94 (Fig. 6) having an opening therein in which is seated an antifriction bearing 98 which surrounds the barrel 92. A retaining cap 100 bolted to the ring 94 and a retaining cap 102 screw threaded to the rear end of the barrel 92 serve to retain the antifriction bearing ring 98 in the ring. The ring 94 is tiltably mounted in a yoke 91 on a pair of diametrically arranged trunnion pins 93. The yoke is in turn fast to a staff 95 slidable within a hole bored in the upper end of one arm 97 of a three arm rocker 99, the rocker being positioned for rocking about an axis parallel to that of the trunnion 93 on trunnions 101. By tilting the rocker forwardly and rearwardly the bearing support for the draw bar may be moved linearly, forwardly or rearwardly. The annular cage 90 has a cam surface 104 cooperable with the rear ends 88 of the levers 82 when moved rearwardly to force the rear ends of the levers inwardly. This effects clockwise rotation of the upper one of the levers and counterclockwise rotation of the lower one of the levers, forcing their forward ends 86 against the bearing plate which in turn forces the draw bar rearwardly with respect to the face of the bearing plate and hence draws the head of the collet into the recess 22 at the forward end of the spindle thus closing the jaws on work extending through the collet. Rearward movement of the annular cam is effected by rearward tilting of the rocker and this in turn by a cam follower 106 mounted on a second arm 103 of the rocker which is held in contact with a cam 108 by a spring 110 stretched between a third arm 105 of the rocker and a fixed stud on the forward bearing support which tends constantly to tilt the rocker forwardly. In operation the cam periodically moves the annular cam rearwardly and then releases it so that the spring 110 is permitted to restore it to its forward position and when the levers 82 are released they return to their inoperative position by the centrifugal forces produced by the rapid rotation of the draw bar.

During relative movement of the draw bar with respect to the spindle, rotation of the draw bar is maintained by a driving latch 112 mounted on the collar 80, a forward portion of which is engaged within one of the notches between teeth 74 on the spacer plate 72. The travel and hence opening and closing of the collet jaws may be varied by rotating the bearing plate 72 so as to change its axial position on the spindle.

The rear end 114 (Fig. 3) of the draw bar is supported in a fixed post 116 and forwardly of the post there is mounted on the draw bar a vibration damper in the form of a block 118 having a central opening in which the draw bar is free to rotate and axially slidable on a plurality of forwardly extending spindles 120 fixed at their rear ends in the post 116. The block 118 is yieldably held forwardly of the post 116 by a plurality of springs 122 and has in its forward face an annular recess 124 in which is seated an antifriction bearing 125. A cover plate 126 having a central hole through it through which the bar passes is bolted over the recess to hold the antifriction bearing 125 in place. The draw bar has on it an annular shoulder 128 which bears against the bearing 125 and provides for taking up the axial thrust and hence for absorbing some of the shock produced by rapid axial displacement of the draw bar. The forward spring of the damper following rearward displacement assists by way of the shoulder 128 to return the draw bar to its forward position.

The work feeding means consisting of a feed finger 130 (Fig. 3) has a split forward end 132 for frictional engagement with the work and a threaded rear end 134 adapted to be screwed into the forward end of a feed tube 136 mounted within the collet and draw bar for rotation therewith and longitudinal movement therein. The rear end of the feed tube extends rearwardly from the draw bar through a ring 138 (Figs. 3 and 5) and has on it a shoulder 140 and threads 142. An antifriction bearing 144 is mounted on the tube behind the shoulder 140 within a groove in the ring 138 and is retained in place on the tube by a sleeve 146 screwed onto the tube and within the ring by a plate 139. The ring is mounted for linear movement on a plurality of horizontal, rearwardly extending spindles 148 so that by sliding movement of the ring 138 on the spindle the feed tube may be reciprocated axially within the draw tube. The ring is mounted on trunnions 141 (Fig. 5) carried by a yoke 143 for tilting about an axis transverse to the axis of the feed tube. The yoke is fast to a staff 145 which is slidable in a hole drilled in a rocker 147, the lower end of which is pivoted on trunnions 149 for tilting about an axis parallel to the axis of the trunnions 141. The rocker 147 has a laterally extending arm on which is mounted a follower 150 which is held in contact with a cam 152 having a plurality of stepped surfaces 154, 156 and 158 thereby providing for variable retraction of the ring and hence of the feed tube. Forward movement of the feed tube is effected by a coil spring 160 stretched between a post 161 fast to the yoke 143 and a post 163 fast to the yoke 91, holding the follower against the cam and operates to move the feed tube forwardly when the cam releases the follower 150.

The cams 108 and 152 are fastened to a cam shaft 162 (Figs. 1 and 2) which is journaled for rotation in bearing members 164 and 166, the latter extending laterally from the supports 40 and 42. The rear end of the bearing shaft extends into a gear reduction unit 168 through which power is supplied by a drive shaft 170. Near the forward end of the cam shaft 162 between the bearings 166—166 there is fastened to the shaft a worm gear 172 which meshes with a subjacent worm gear 174 fast to a horizontally extending shaft 176 journaled at its opposite ends in bearings 178 and 180 (Fig. 4). At the opposite side of the machine the shaft 176 has fast to it a worm gear 182 which meshes with a worm gear 184 fastened to a countershaft 186 parallel to the cam shaft 162. The forward end of the cam shaft 162 (Fig. 1) has fast to it a cam 188 and the forward end of the countershaft 186 (Fig. 2) has fast to it a cam 190. Between the shafts at the front of the machine (Figs. 2 and 4) there is a bearing block 192 carrying a trunnion pin 196. At the left side of the machine as seen in Fig. 4, a rocker 194 is pivotally mounted on the pin 196 for arcuate movement of its upper end to and from the center line of the axis of rotation of the collet. The upper end of the rocker has fast to it a tool 196 (Fig. 1) arranged in a position to operate on work projecting forwardly from the collet and on the rear side of the rocker there is a boss 198 in which is threaded a follower 200 which bears against the cam 188 and is displaced thereby, inwardly to cause the rocker to move inwardly on its pivot. A pin 202 fastened to the lower part of the rocker has connected to it a spring 204 which normally serves to hold the follower in contact with the cam and hence to cause it to rock in accordance with the design of the cam. By adjusting the position of the follower 200 the depth of cut that the tool will make may be varied to turn the work down to a predetermined diameter or to cut it entirely off. One or more tools may thus be mounted for operation on the work to perform single operations, such as cutting off or combined operations, such as first turning the work down to a given diameter and then cutting it off. The operations performed may be timed so that the turning and cutting off are performed simultaneously or successively. When more than one tool is to be used additional rockers will be provided of the kind just described; hence it is not deemed necessary to further illustrate them.

A second rocker 206 (Fig. 4) is pivotally mounted on a trunnion pin 208 fast to the bearing block 192 and has adjustably fastened to its upper end a bracket 210, a screw 212 extending through a slot in the bracket into the rocker providing for this adjustment. The inner end of the bracket has mounted on it a vernier gauge 214 which by rotation of its handle 216 effects axial movement of the work engaging end 218 toward and away from the collet. The rocker is moved into operative position by engagement of a follower 216 screwed into the backside thereof which has contact with the cam 190. The radial throw of the cam is such that the vernier gauge is moved into alignment with the leading end of the work projecting from the collet. The rocker is held in contact with the cam by means of a spring 221 fastened at one end to a rod 218 fixed in the lower end of the rocker and a port 220 at the base of the rocker.

A delivery trough 224 (Fig. 2) is supported below the collet and cut off tool and is inclined forwardly and downwardly so that work cut off will fall into it and be discharged forwardly of the moving parts of the machine for collection in a suitable receptacle.

At the rear end of the machine (Fig. 2) there is a work holder and guide at least equal in length to the length of the work piece which is at any time fed to the machine. The holder is in the form of a hollow tube fixed in a horizontal position in alignment with the axis of the feed tube and serves to hold the work throughout its forward feeding movement and to prevent whipping by reason of its rapid rotation.

In operation a length of stock of the desired diameter for use in making the parts desired is pushed through the guide tube into the rear end of the feed tube and forwardly therethrough until its forward end is frictionally engaged within the spring fingers at the nose 132 of the feed tube. Suitable tools are then mounted on the rocker or rockers 194 for either turning down or cutting off the work and the vernier gauge 214 is adjusted so that the distance between the cutting edges of the tool and the end of the gauge is exactly equal to the length of the piece to be cut off and/or the length to be turned down. The machine is then started, for example, by shifting the belt 64 on to an overhead running pulley or to a motor driven pulley mounted adjacent the machine whereupon rotation is imparted to the spindle 18 and by way of the bearing plate 72, latch 112 and collar 80 to the collet draw tube so that the collet, its draw tube, the feed tube, the collar 80 and the annular cam 90 mounted on the draw tube are all rotating at a high rotational speed. Under these conditions in the absence of means constraining the rear ends of the levers 82 the centrifugal forces in effect throw the levers outwardly thus permitting the buffer springs and the spring 110 to hold the collet forwardly of the head of the spindle 20 with its jaws distended ready for feeding movement of the work therethrough. Rotation is also imparted to the shaft 170 from the same source of power or a different source of power as described and hence to the cam shaft 162. The cams 108 and 152 are mounted on the cam shaft 162 in such position that the cams 108 and 152 are simultaneously inoperative during part of the rotation of the cam shaft and during another part successively operable. While both cams are inoperative the jaws of the collet are open and the feed tube is being urged forwardly by the spring 160 which forces the work through the collet jaws into engagement with the gauge 218 holding it yieldably against the gauge. The cam 108 first begins to operate on the follower 106 forcing the annular cam 90 rearwardly. The annular cam has abrupt cam surfaces 104 on it which act on the rear ends of the levers 82 to close them quickly thus drawing the collet tube rearwardly and hence the jaws of the collet into the conical opening 22 closing them on the work while the latter is still yieldably held against the gauge. Immediately following closing of the collet jaws the cam 152 comes into operation moving the ring 138 rearwardly which carries the rear end of the feed tube and thus drawing the feed tube rearwardly along the work while the later is held clamped in the collet jaws. The spring fingers at the feeding end of the feed tube while frictionally engaged therewith will slide freely along the work while the work is held clamped. Simultaneously, the cam 188 moves the cutting tool or tools into engagement with the work and the cam 190 retracts the gauge so as not to interfere with the movement of the cutting tools. As soon as the work is turned and is cut off and the cam 188 releases the tool for retraction the gauge is moved back into operative position for measuring the next piece to be cut. The cam 108 then becomes ineffective whereupon the spring 110 draws the annular cam 90 forwardly, releasing the lever arms 82 and thus permitting the draw tube to be forced forwardly and in turn to release the collet jaws for movement of a successive length of work thereto for clamping and cutting.

By use of suitable cutting off and turning down tools the advancement of the work against the gauge permits cutting successive lengths of work to accurate dimensions within five ten thousands without having to face off the leading end of the work as each piece is cut off hence eliminating the separate operation customarily required in lathe work of facing the leading end of the successive piece after the preceding piece has been cut off. By using a suitable rake on the cutting tools the center bur may be eliminated on the cut off piece and so far reduced at the leading end of the next piece as to be negligible and hence to eliminate the extra operation heretofore required of removing this bur. By employing maximum cutting speeds, for example, in the order of 400 linear feet per minute, eliminating the facing operation and speeding up feeding the work, the piece rate of production is increased enormously.

The machine variously equipped with different size feed tubes will take diameters from .0000 up to and including .093 or 3/32 of an inch, from .0000 up to and including .187 or 3/16 of an inch and from .0000 up to and including .312 or 5/16 of an inch. The spindle unit is so designed that it and the feeding mechanism can be dismantled for repair such as new bearings, belt, or collet, and can be reassembled within a period of one hour. A new job can be set up on this machine with the proper cut-off tool, feed finger, and chuck in less than one hour. Over a long period of running and testing, this machine has proven to have no breakdowns which would take longer than two hours to repair. The spindle mechanism is so designed that complete feed out and cut-off time of the spindle is 1/25 of one second. This 1/25 of one second is actually all the time it takes to open the collet, feed out, and close again. The machine will run at a speed of 15,000 pieces per hour or more on diameters up to .225 and lengths up to .625 on brass or aluminum. It will also run up as high as 5000 to 7000 pieces per hour on certain steels.

This machine requires no facing off operation and yet will hold tolerances on lengths as close as .0005. This includes the cut-off bur. This tolerance can be held in speeds up to 8000 to 10,000 pieces per hour on soft metals and will hold as close as .001 in speeds up to 12,000 or 13,000 pieces per hour.

The machine is not equipped with cross slides but rather with sturdy rocker arms which are cam fed and will hold tolerances on diameters at slow speeds (3000 to 5000 pieces per hour) as close as .001 in speeds up to 7000 to 10,000 pieces per hour, on soft metals it will hold as close as .0015 or .002.

In certain instances it is desirable to employ a circular cutter in the form of a saw particularly when cutting tubular stock. In this event the rocker 194 (Fig. 4) is removed and a similar rocker 220 substituted therefor which carries a saw attachment 222 (Fig. 8). The saw attachment comprises a bearing 224 in which is journaled a shaft 226 having fastened to one end a saw blade 228 and at its opposite end a pulley (not shown) by which it is rotated. The rocker as previously described has fastened to its rear side a follower for engagement with the cam 188 by which it is moved inwardly to effect cutting and is yieldably urged outwardly by a spring 204 (Fig. 4) connected to a pin 202. The saw is inclined to cause vibration of the work projecting forwardly from the collet hence additional support in the form of a pair of clamping jaws 234 (Fig. 9) are provided between the forward face of the cutting blade and the gauge. The jaws comprise a clamp 236 pivoted at 238 and a clamp 240 pivoted at 242. At their upper extremities the jaws have hardened plates 244 which have V-notches for engagement with the work. The clamp 236 is yieldably supported in an upright position by a spring and cap 245 and 247 (Fig. 9). The clamp 240 has extending rearwardly from it a cam follower 246 which bears against an operating cam 248, the latter being operable to force the clamp inwardly against the stock and clamp the stock between the plates 244. A pin 250 and spring 252 returns the clamp 240 to an inoperative position when the cam releases it. The yield provided in the clamp 236 allows for variation in the size of the work and minimizes the possibility of crushing the work between the jaws. The entire unit consisting of the jaws and the saw may be removed and replaced by the cutting tools when the lathes are to be used.

The sawing attachment is for tubular stock and can saw pieces in lengths up to .750 long at a speed of 8000 to 10,000 pieces per hour. Due to the precision holding mechanism of this saw attachment, pieces can be cut free of bur on both sides and outside diameters.

It should be understood that the present disclosure is for the purpose of illustration only and that this invention includes all modifications and equivalents which fall within the scope of the appended claims.

I claim:

1. In a lathe a collet, a gauge having an operative position opposite the jaws in alignment with the leading end of the work extending from the jaws, means for closing the jaws on the work, yieldable means for yieldably holding the work against the gauge prior to and during closing of the jaws on the work to clamp the same, means for effecting rotation of the collet about its longitudinal axis, a lever operable to effect axial displacement of the draw tube to close the collet jaws on the work, said lever normally being rendered ineffective by the centrifugal forces of rotation and a cam operable to move the lever into operative position in opposition to the centrifugal forces.

2. In a lathe a collet for receiving a length of work, said collet having jaws operable to close on the work to hold it at a fixed position, a gauge having an operable position in alignment with the leading end of the work projecting from the collet against which the leading end may be advanced to present an exactly predetermined length of work for cutting, a feed tube for advancing successive lengths of work to the collet, said feed tube operating to apply a constantly feeding force to the work while the collet jaws are closing on the work, bearings supporting the collet and feed tube for rotation on the longitudinal axis of the work, means for effecting rotation of the collet and feed tube and hence the work, cam levers carried by the collet tube for rotation therewith, said levers having contact with an axially stationary abutment and operable by pivotal movement against the abutment to effect axial movement of the collet tube, said levers normally being held in an inoperative position by the centrifugal forces due to rotation of the collet and feed tube, and a cam for moving the levers into operative position in opposition to the centrifugal forces.

3. In a high speed automatic lathe in which work is advanced into position against a gauge stop to measure off a predetermined length, is clamped in said position and cut off, a rotating collet, a draw tube connected to the collet, means operable on the draw tube alternately to effect axial displacement of it in a direction to close the collet and to open it and to clamp and unclamp the work as successive pieces are measured and cut off, the time interval for feeding, clamping and cutting off being very short, so that the parts are moving at a very rapid rate and a cushion at the rear end of the draw tube operable to absorb the impact of the rapidly rotating and reciprocating draw tube without retarding its rotation.

4. In a high speed lathe a collet having a draw tube, bearings supporting the draw tube for axial and rotary movement, means for effecting rotation of the collet, yieldable means normally operating on the draw tube in a direction to release its jaws, means including a cam periodically operable to effect movement of the draw tube in opposition to said yieldable means to close the jaws, said last-named means being normally rendered inoperable by the centrifugal forces developed by rotation of the tube between periods of operation of the cam.

5. In a high speed lathe a collet having a draw tube, a spindle within which the draw tube is mounted for axial and rotary movement, bearings supporting the spindle for rotational movement, means for effecting rotation of the spindle, a collar fast to the draw tube, cam levers mounted on the collar and rotatable therewith, said cam levers being normally held inoperative by centrifugal forces, said cam levers bearing against and being operative by pivotal movement in opposition to the centrifugal forces acting thereon to effect relative axial movement between the draw tube and the spindle to close the collet jaws, a cam for effecting such pivotal movement of the cam levers and a latch carried by the collar drivably connecting the draw bar and spindle for effecting concomitant rotation of the draw bar and spindle.

6. In a high speed automatic lathe wherein the work is intermittently advanced against a gauge, clamped and cut off a collet having a jaw and a draw tube extending rearwardly therefrom, a spindle mounted for rotation in bearings within which the draw tube is mounted for rotation and axial movement, said spindle having at one end a cam surface for closing the jaws of the collet on the work when the draw tube is moved rearwardly within the spindle, means for effecting rotation of the spindle, a bearing face plate fast to the spindle having a flat face and notched edge, a collar fast to the draw tube rearwardly of the spindle, a driving latch operably connecting the spindle and draw tube in concomitant rotation without impairing relative axial movement, a pair of levers pivotally balanced on the collar having forward ends engaged with the bearing plate and rear ends within an annular cam which constrains outward movement thereof, said annular cam being movable to effect inward movement of the levers, a cam for effecting movement of the annular cam in one direction and a spring operable to effect movement of the annular cam in the other direction, said levers being operable by inward movement to apply an axial force to the bearing plate which effects rearward movement of the draw tube within the sleeve.

7. In a high speed automatic lathe in which the work is intermittently advanced, gauged, clamped and cut off, a collet and draw bar therefor, a fixed bearing for rotatably and reciprocally supporting the collet and the forepart of the draw bar, a second bearing rotatably supporting the rear part of the draw bar, said second bearing being adapted to impart linear movement to the draw bar to distend or close the jaws and including, means supporting it for movement about spaced parallel axes at right angles to the axis of the draw bar and transversely thereof, means permitting movement of the second bearing perpendicular to the parallel axes along a line intersecting the axis of the draw bar and means for effecting rocking movement of the bearing about one of the parallel axes.

8. In a high speed automatic lathe in which the work is intermittently advanced, gauged, clamped and cut off, a collet and draw bar therefor, a spindle supporting the collet for rotary and reciprocal movement, fixed bearings supporting the spindle, a second bearing rotatably supporting a rearwardly extending part of the draw bar, and means supporting said second-named bearing for pivotal movement with reference to spaced parallel axes transversely and at right angles to the axis of the draw bar and for linear movement perpendicular to said parallel axes.

9. In a high speed automatic lathe in which the work is intermittently advanced, gauged, clamped and cut off, a collet and draw bar therefor, bearings supporting the collet and the forward part of the draw bar for rotation and longitudinal movement, and a bearing for rotatably supporting the rear part of the draw bar, said bearing comprising diametrically arranged trunnions supporting the bearing for tilting movement about horizontal axis transversely of the draw bar, a rocker pivoted for movement about a horizontal axis spaced from and parallel to the axis of the trunnions and a staff mounted in the rocker linearly slidable in a direction perpendicular to the axis of the rocker and the trunnions, said trunnions being mounted on the upper end of the staff.

10. In a high speed automatic lathe in which the work is intermittently advanced, gauged, clamped and cut off, a collet and draw bar therefor, bearings supporting the collet and the forward part of the draw bar for rotation and longitudinal movement, and a bearing for rotatably supporting the rear part of the draw bar, including a yoke embracing the bearing, trunnions fixed to the yoke diametrically of the bearing and supporting the bearing for tilting movement about a horizontal axis transversely to the bearing, a staff fast to the lower side of the yoke perpendicular to the axis of the trunnions, a rocker having a bore in it within which the staff slidably fits for axial linear movement therewithin, and means supporting the rocker for pivotal movement about an axis parallel to the axis of the trunnions.

11. In a high speed automatic lathe in which the work is intermittently advanced, gauged, clamped and cut off, a collet and draw bar therefor, a fixed bearing for rotatably and reciprocally supporting the collet and the forepart of the draw bar, a second bearing rotatably supporting the rear part of the draw bar, a yoke supporting the second bearing for tilting movement about an axis transverse to the axis of the draw bar, a rocker supporting the yoke for pivotal movement about an axis spaced from and parallel to the first-named axis and for linear movement perpendicular thereto, means carried by the bearing operable by axial movement of the bearing to impart axial movement to the draw bar and cam means operable to tilt the rocker.

12. In a high speed automatic lathe in which the work is intermittently advanced, gauged, clamped and cut off, a collet and draw bar therefor, a fixed bearing for rotatably and reciprocally supporting the collet and the forward part of the draw bar, a second bearing rotatably supporting the rear part of the draw bar, a yoke supporting the second bearing for tilting on an axis transverse to the axis of the draw bar, a rocker supporting the yoke for pivotal movement about an axis spaced from and parallel to that of the bearing and for linear movement perpendicular thereto, means carried by the draw bar, operable by axial movement of the bearing to impart an axial thrust to the draw bar, a spring normally operating on the rocker to tilt it in one direction and a cam operable to tilt the rocker in the opposite direction.

13. In a high speed automatic lathe in which the work is intermittently advanced, gauged, clamped and cut off, a collet and draw bar therefor, a fixed bearing for rotatably and reciprocally supporting the collet and forward part of the draw bar, a second bearing rotatably supporting the rear part of the draw bar, said draw bar being normally slidable axially therein, levers pivotally mounted on the draw bar operable by pivotal movement to impart an axial thrust to the draw bar, an annular cam mounted on the second bearing operable by axial movement to effect operation of said levers, and cam means for effecting axial movement of the bearing.

References Cited in the file of this patent

UNITED STATES PATENTS

| | | |
|---|---|---|
| 594,077 | Gauthier | Nov. 23, 1897 |
| 1,226,303 | Brightman | May 15, 1917 |
| 1,355,340 | Jones | Oct. 12, 1920 |
| 1,389,975 | Parsons | Sept. 6, 1921 |
| 1,830,027 | Hayden | Nov. 3, 1931 |
| 2,044,497 | Shiltz | July 16, 1936 |
| 2,109,786 | Taft | Mar. 1, 1938 |
| 2,372,004 | Kingsinger | Mar. 20, 1945 |
| 2,374,112 | Lloyd | Apr. 17, 1945 |
| 2,516,305 | Dunn | July 25, 1950 |
| 2,718,168 | Kendall | Sept. 20, 1955 |

FOREIGN PATENTS

| | | |
|---|---|---|
| 17,312 | France | May 29, 1913 |